(12) United States Patent
Yoda et al.

(10) Patent No.: US 7,123,371 B1
(45) Date of Patent: Oct. 17, 2006

(54) DOCUMENT INPUT SYSTEM AND DOCUMENT INPUT METHOD

(75) Inventors: Nobuhisa Yoda, Kamakura (JP); Yoshifumi Takayama, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/386,335

(22) Filed: Aug. 31, 1999

(30) Foreign Application Priority Data

Dec. 7, 1998 (JP) ................................. 10-347035

(51) Int. Cl.
*G06F 15/00* (2006.01)
*H04N 1/00* (2006.01)

(52) U.S. Cl. ............... 358/1.15; 358/1.14; 358/1.16; 358/403; 358/434

(58) Field of Classification Search ............... 358/1.14, 358/1.15, 403, 434, 1.16; 399/80; 354/434; 395/112
See application file for complete search history.

(56) References Cited

U.S. PATENT DOCUMENTS

| | | | | |
|---|---|---|---|---|
| 5,406,384 A | | 4/1995 | Sakuragi ..................... 358/403 |
| 5,414,494 A | * | 5/1995 | Aikens et al. ................. 399/1 |
| 5,459,579 A | * | 10/1995 | Hu et al. ...................... 358/296 |
| 5,517,556 A | | 5/1996 | Pounds et al. |
| 5,583,655 A | | 12/1996 | Tsukamoto et al. |
| 5,764,368 A | | 6/1998 | Shibaki et al. .............. 358/296 |
| 5,881,233 A | * | 3/1999 | Toyoda et al. .............. 709/233 |
| 5,946,457 A | * | 8/1999 | Nakai et al. ................. 358/1.13 |
| 6,029,238 A | * | 2/2000 | Furukawa ...................... 712/1 |
| 6,128,102 A | * | 10/2000 | Ota ............................. 358/403 |
| 6,266,162 B1 | * | 7/2001 | Okamura et al. ........... 358/468 |
| 6,292,267 B1 | * | 9/2001 | Mori et al. ................. 358/1.15 |
| 6,437,875 B1 | * | 8/2002 | Unno ........................ 358/1.16 |
| 6,559,964 B1 | * | 5/2003 | Tsukamoto et al. ........ 358/1.15 |

FOREIGN PATENT DOCUMENTS

| | | |
|---|---|---|
| JP | 4-320132 | 11/1992 |
| JP | 7-250194 | 9/1995 |
| JP | 10-42114 | 2/1998 |
| JP | 10 042114 A | 2/1998 |
| JP | 10042114 A1 * | 2/1998 |

OTHER PUBLICATIONS

European Search Report re: European patent application No. 99306896.4 mailed Jan. 3, 2002.

* cited by examiner

*Primary Examiner*—Douglas Q. Tran
*Assistant Examiner*—Chan S. Park
(74) *Attorney, Agent, or Firm*—Finnegan, Henderson, Farabow, Garrett & Dunner, L.L.P.

(57) ABSTRACT

This invention provides a document input system comprising at least a digital copier for inputting a document image and information relating to the document image, the information relating to the document image including information about a transmission destination, at least a system serving as a transmission destination of a document image inputted by the digital copier, storage means for storing the document image inputted by the digital copier and information relating to the document image, and transmitting means for reading the information relating to the document image stored in the storage means periodically and transmitting a document image corresponding to the information relating to the document image stored in the storage means based on the information relating to the read document image.

20 Claims, 14 Drawing Sheets

| PANEL # | BUTTON # | TRANSMISSION AGENT | REGISTRATION/ TRANSMISSION DESTINATION | TITLE |
|---|---|---|---|---|
| 1 | 1 | FILING | ACCOUNTING/ WEEKLY REPORT DB | WEEKLY REPORT, DATE, USER |
| 1 | 2 | E-MAIL | foo@bar.org | PROPOSITION |
| 2 | 1 | FILING | TECHNICAL INFORMATION DB | NEW TECHNOLOGY, DATE |
| 2 | 2 | IMAGE INPUT | USER X | CATALOG, USER |

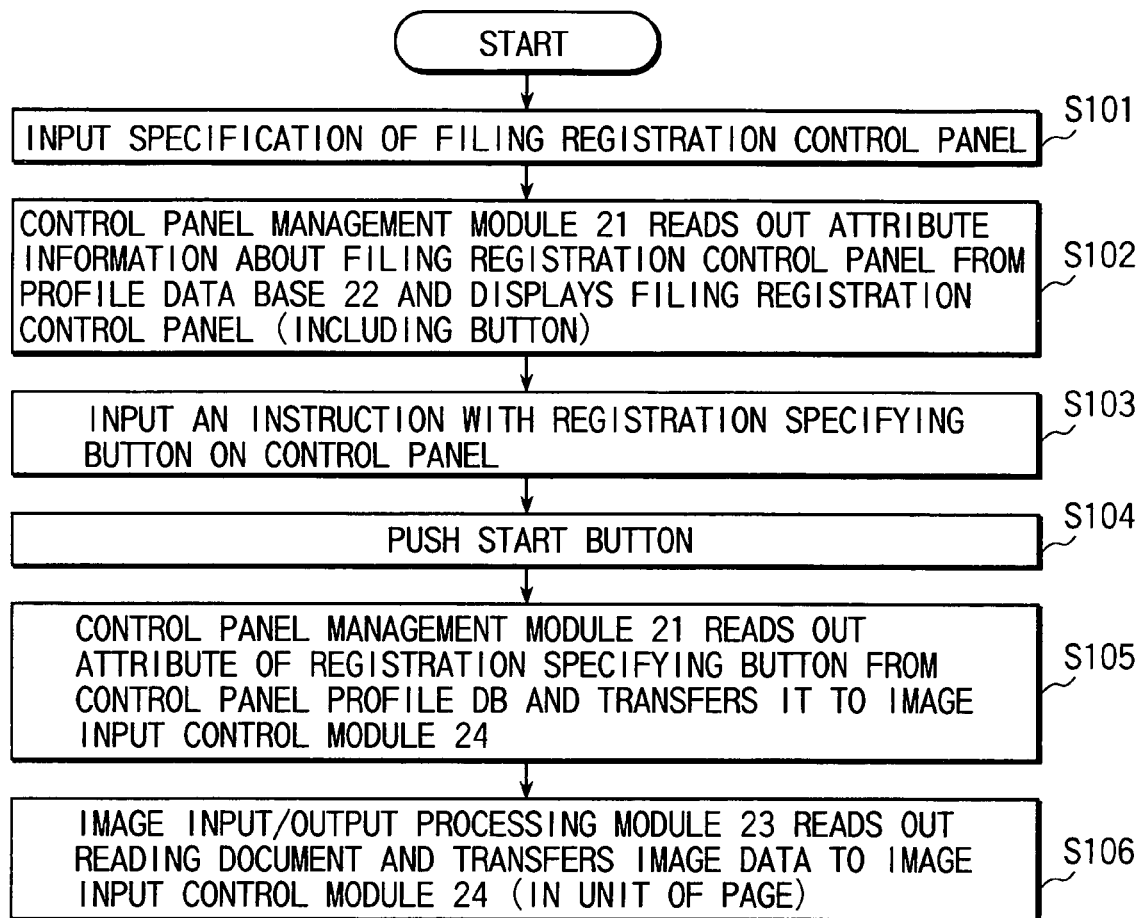
FIG. 4A
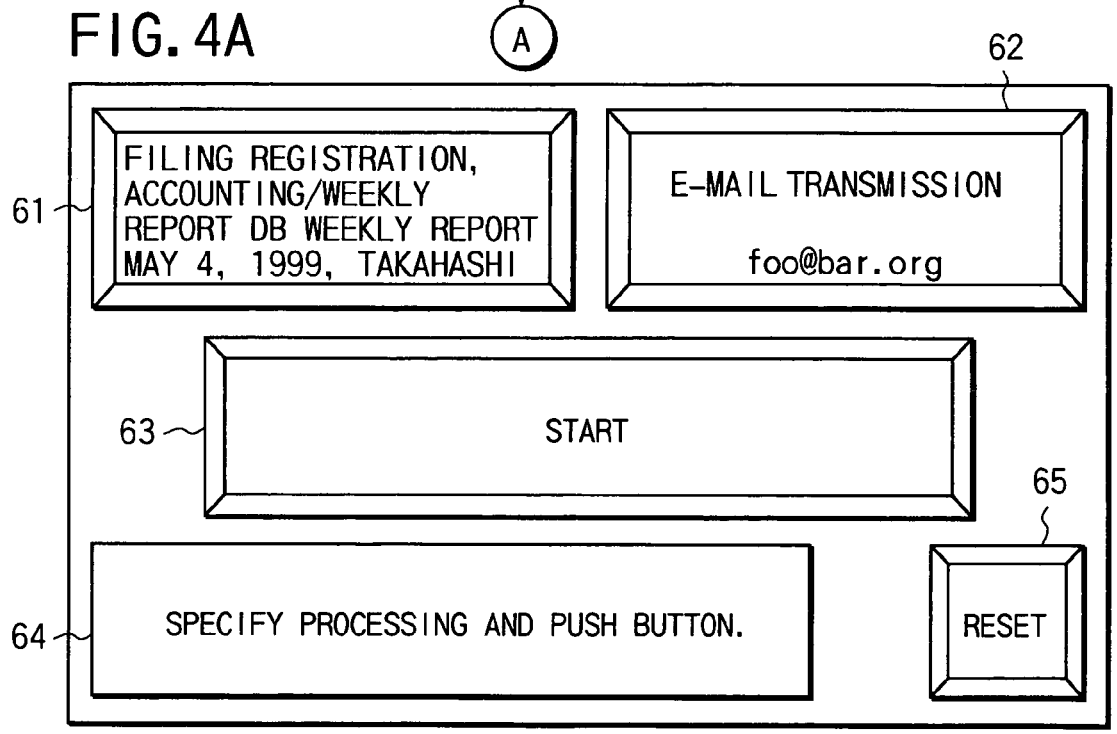
FIG. 6   CONTROL PANEL NUMBER = 1

DOCUMENT READING

TERMINAL NAME: SCANME          USER NAME: MANAGER

| DOCUMENT NAME | TIME | STATE | CAPACITY | PAGE NUMBER |
|---|---|---|---|---|
| DOCUMENT A | 11-10-1998/11:12 | OK | 640KB | 5 |
| DOCUMENT B | 11-10-1998/11:11 | OK | 1MB | 10 |
| DOCUMENT C | 11-10-1998/10:55 | OK | 640KB | 8 |
| DOCUMENT D | 11-10-1998/10:52 | ERROR | 240KB | 8 |

[READ] [DELETE] [UPDATE] [PROPERTY] [CLOSE]

FIG. 11

DOCUMENT INPUT SYSTEM AND DOCUMENT INPUT METHOD

BACKGROUND OF THE INVENTION

The present invention relates to a digital input apparatus for digitizing information recorded in a paper document for input, document input system structured in connection with a server system for document filing or the like, and document input method.

In general, digital copiers (DPPC) have been widely used and use of the digital copier enables image information recorded in a paper document to be digitized easily and subjected to various processings. The digital copier has a number of functions, including a function for transmission/reception of digitized image information via communication line for FAX sending, printing and the like as well as basic function as a copier such as enlargement, reduction and double-sided copying and the like.

In recent years, it can be considered that this digital copier is used as a digital input apparatus and used as a server system connected via network.

For example, Jpn. Pat. Appln. KOKAI Publication No. 10-42114 has disclosed a copier control system in which the digital copier is used as digital input apparatus.

The copier control system disclosed in Jpn. Pat. Appln. KOKAI Publication No. 10-42114 comprises a plurality of digital copiers connected to communication line and a server. The server has an image file directory containing an image file for storing image data transmitted from each of the digital copiers and a client directory containing a receiving header management file for storing management data for image data to be received, produced for each of the digital copiers. The digital copier has function for accessing the receiving header management file of its own client directory of a server periodically upon reception so as to confirm whether or not there is an image data to be received, and if there is an image data to be received, accessing that image file directory and then fetching in the appropriate image data.

Conventionally, a system in which the digital copier is used as a digital input apparatus and combined with a server system has been considered.

In case where the digital copier is used as an input apparatus for the image data (document image), it can be imagined that plural users stop at the copier machine and carry out input operation just like copying in office.

In such a situation, in order that the digital copier is used in combination with other system, various kinds of information relating to the inputted document image need to be inputted. For example, not only a key word preliminarily determined to retrieve a document image is inputted, but also information determined upon input of the document image, like when the document image has been inputted by whom, is important. Further, how the inputted document image should be stored in other system and how it is managed also need to be specified. However, because generally the digital copier has no key board capable of inputting any character, it is difficult for user to input the aforementioned various kinds of information. Even if the key board is provided, that work is a very complicated and troublesome work.

In case where the input device is a specialized system for a particular purpose, it can be estimated that user intending to register a document image will not leave the system until the input operation is completed. However, in case where the digital copier is used as an input device, because the digital copier provides various functions such as copy, FAX transmission/reception and printing as a single digital input/output device, it is necessary to minimize a time occupied by user for a single operation and maximize sharing efficiency. Thus, when an reading operation for a document image prepared by user is terminated, user may leave the digital copier in order to open the copier to other user or function.

That is, there is a problem that if after an input of a document image, user is off the digital copier when an error occurs before a registration of the inputted document image in other system is completed, the error cannot be notified, so that encouragement for inputting again is disabled therefore convenience of use of the digital copier being poor.

BRIEF SUMMARY OF THE INVENTION

The present invention has been achieved in views of the above mentioned problems and therefore it is an object of the invention to provide a document input system and document input method capable of inputting a document image ensuring convenience of use under an environment in which a shared device is used as an input device.

To achieve the above object, according to a first aspect of the present invention, there is provided a document input system comprising: at least one digital copier for inputting a document image and information relating to the document image, the information including information about a transmission destination;

at least one system serving as a transmission destination of the document image inputted by the at least one digital copier;

storage means for storing the document image inputted by the at least one digital copier and information relating to the document image; and transmitting means for reading the information relating to the document image stored in the storage means periodically and transmitting the document image corresponding to the read out information to one of the at least one system based on the read out information relating to the document image.

According to a second aspect of the present invention, there is provided a document input system according to the first aspect, wherein the storage means includes sub-storage means, provided so as to correspond to the at least one system respectively, for storing the document image and the information relating to the document image, and the transmitting means includes sub-transmitting means, provided so as to correspond to the at least one system respectively, for transmitting the document image to one of the at least one system based on the information relating to the document image read out.

With such a structure, to make the digital copier link with plural systems, transmitting means (data transfer agent) corresponding to each system is incorporated and further, storage means (transfer disk) is provided for each transmitting module. The storage means for storing a document image inputted by the digital copier is specified according to the information inputted with the document image. The transmitting means reads out a document image from each corresponding storage means periodically and if there is a document image, it is registered in a predetermined system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are flow charts for explaining an operation from input of a document image to registration thereof into a filing system;

FIG. 6 is a diagram showing an example of a control panel corresponding to panel number 1;

FIG. 8 is a flow chart for explaining a processing of a filing agent 34a;

FIG. 11 is a diagram showing an example of dialog for document image reading displayed by an image handling application 36d;

FIG. 14 is a diagram showing data to be stored in a filing transfer disk 32a;

DETAILED DESCRIPTION OF THE INVENTION

Figure 1:
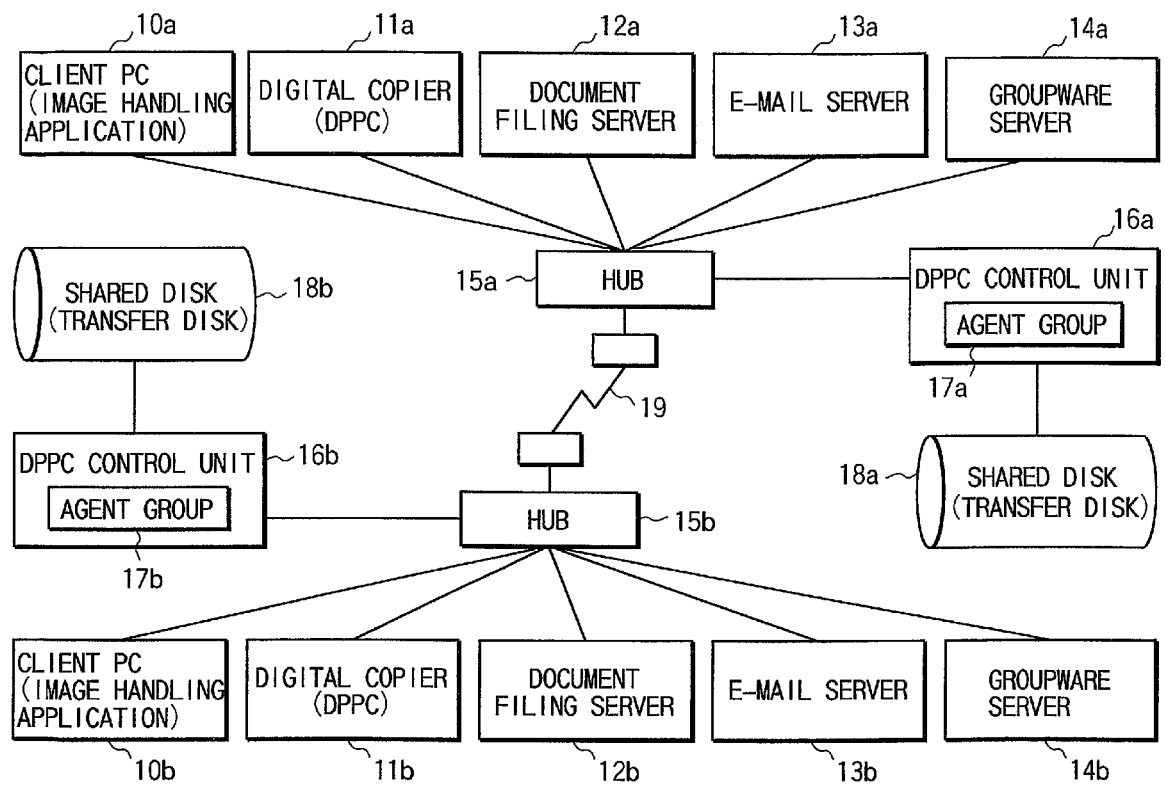
FIG. 1 is a block diagram showing a conceptual system structure according to this embodiment.

Hereinafter, the embodiments of the present invention will be described with reference to the accompanying drawings. FIG. 1 shows a conceptual system structure of an embodiment of the present invention.

As shown in FIG. 1, according to the system of this embodiment, client PCs 10a, 10b for use by user for displaying document (document image) or E-mail, digital copiers (DPPC) 11a, 11b for printing digital document image to a paper medium and inputting document image on the paper medium as well as copying paper document, document filing servers 12a, 12b for managing documents, E-mail servers 13a, 13b for managing transmission and reception of E-mails, and groupware servers 14a, 14b for providing with electronic bulletin board and schedule management environment are connected by network via HUBs 15a, 15b in each group.

Further, DPPC control units 16a, 16b for managing document images inputted via the digital copiers (DPPC) 11a, 11b and transferring the document image to various servers such as the document filing servers 12a, 12b and application are connected to the HUBs 15a, 15b.

In the DPPC control units 16a, 16b, a predetermined agent (data receiving agent 30 described later) included in agent groups 17a, 17b receives a document image inputted via the digital copiers 11a, 11b and the document image is registered in a transmission destination by an agent (transmission module) prepared corresponding to a document image transmission destination (server or the like), that is, a filing agent 34a, E-mail agent 34b, groupware agent 34c, document transfer agent 41. Although in FIG. 1, the DPPC control units 16a, 16b are provided for each group (that is, a group of apparatuses connected to the HUB 15a and a group of apparatuses connected to the HUB 15b), a DPPC control unit may construct this system as long as agents operating thereon are capable of carrying out transmission and reception of data with each digital copier.

The DPPC control units 16a, 16b (agents) manage document images inputted via the digital copiers 11a, 11b in each shared disks 18a, 18b for every transmission destination and periodically read so as to detect whether or not there is any document image to be transmitted. If there is such a document image, the DPPC control units transmit it to a transmission destination. That is, the shared disks 18a, 18b function as transfer disks for transmitting document images inputted via the digital copiers 11a, 11b to a predetermined transmission destination by an agent corresponding thereto.

In an example shown in FIG. 1, two work groups are connected by an intranet 19 and in each group, the apparatuses are connected to each other by the HUBs 15. In this case, it is assumed that, for example, upper level group workers share the digital copier 11a, while lower level group workers share the digital copier 11b. Although only one digital copier is provided in each group for simplification of description, it is permissible to provide with plural digital copiers.

A structure of a software system module to be realized on the system shown in FIG. 1 will be described with reference to the conceptual diagram shown in FIG. 2.

Figure 2:
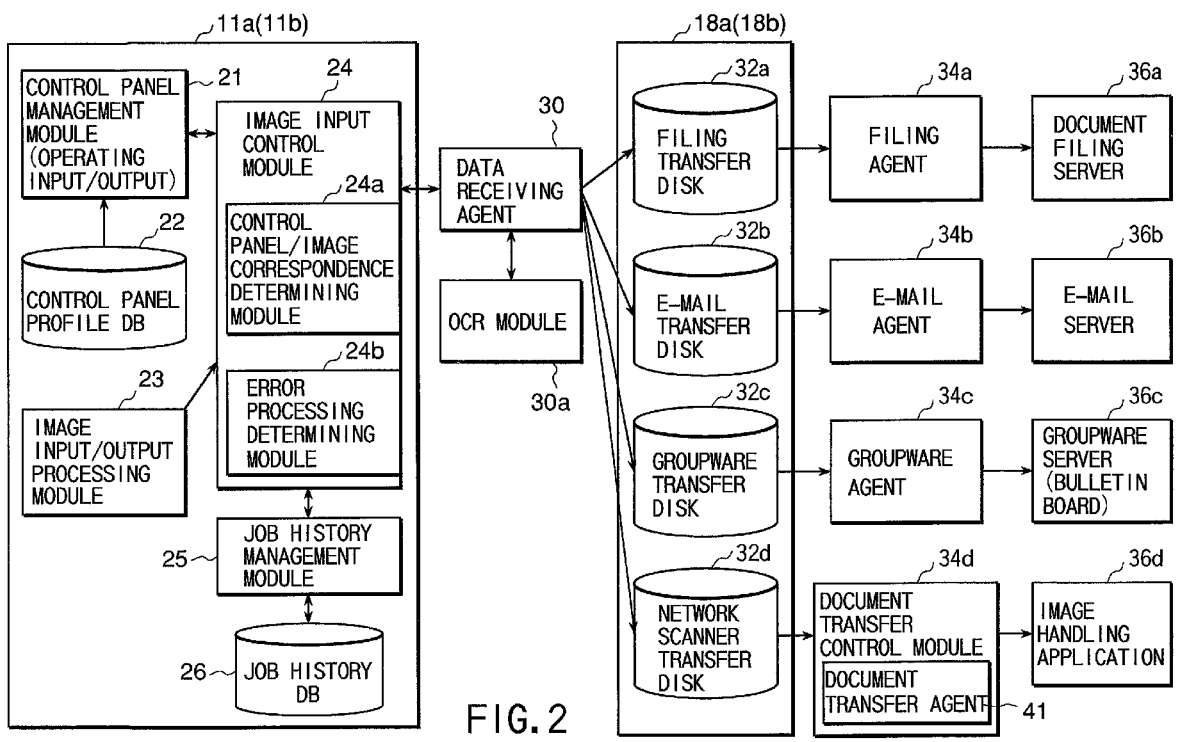
FIG. 2 is a conceptual diagram showing a software system module to be realized on the system shown in FIG. 1.

As shown in FIG. 2, the digital copier 11a (11b) includes functions of control panel management module 21, control panel profile data base 22, image input/output processing module 23, image input control module 24, job history management module 25 and job history data base 26.

The control panel management module 21 inputs various information via a control panel under a control of the image input control module 24 and by managing the control panel based on information stored in the control panel profile data base (DB) 22 described later (changing to a control panel corresponding to a function provided by the digital copier), sets up a function and environment for use by the digital copier corresponding to a user's operation of the control panel. The control panel is provided by displaying plural buttons at a predetermined position on, for example, liquid crystal display. Information generated upon an operation for inputting a document image (for example, user name, operation date, group name, certification information and the like) as well as information (for example, document registering destination data base name, agent name and the like) specified with a button (described in detail later) provided on the control panel can be inputted to the control panel management module 21.

Figures 3, 5:
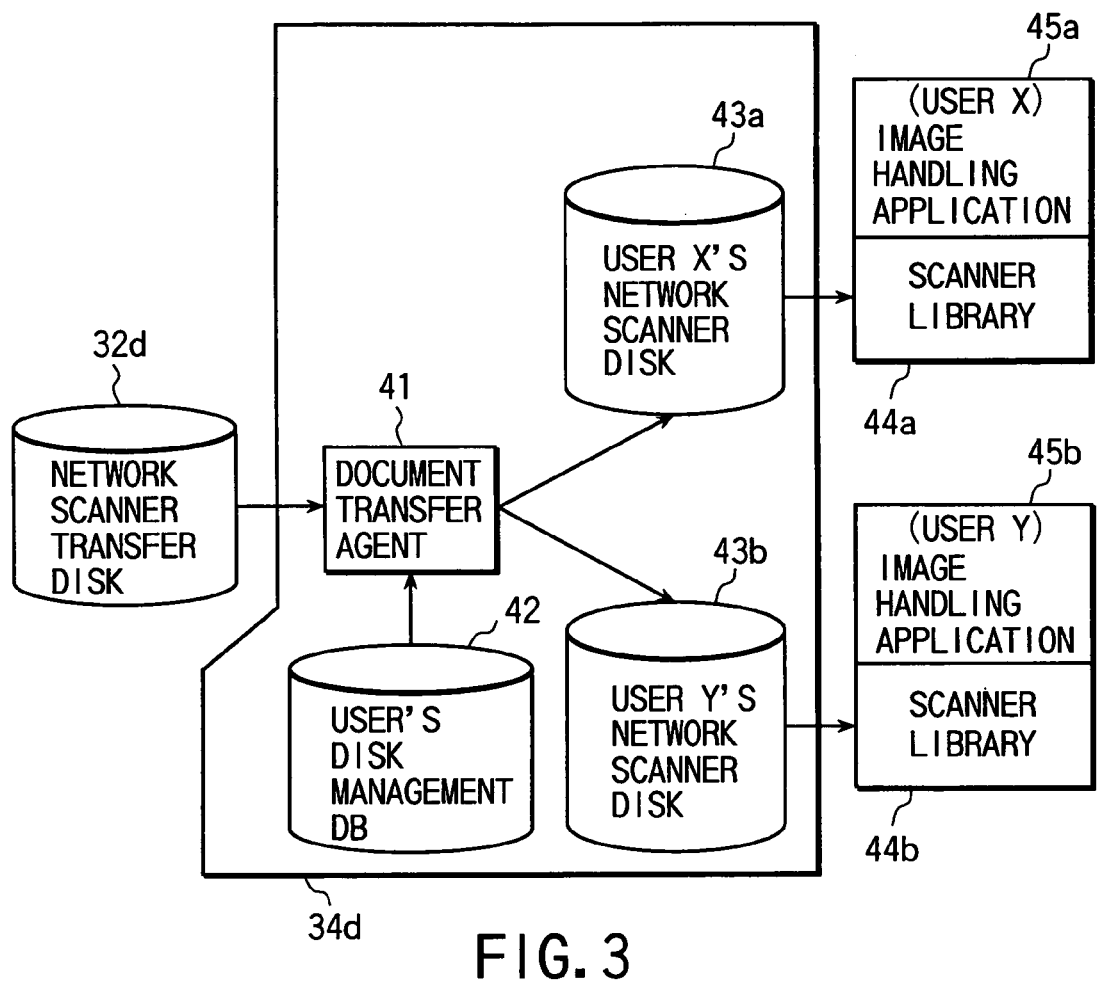
FIG. 3 is a diagram showing a detailed structure of a document transfer control module 34d of FIG. 2.
FIG. 5 is a diagram showing an example of information registered in a control panel profile data base 22.

The control panel profile data base 22 contains information about the control panel corresponding to various kinds of its functions and buttons provided therein so as to change the control panel by means of the control panel management module 21 corresponding to a function provided by the digital copier. The content of information to be registered in the control panel profile data base 22 is arbitrarily rewritable by an operation of the control panel managed by the control panel management module 21. A concrete example of information to be registered in the control panel profile data base 22 will be described later (FIG. 5).

Under a control of the image input control module 24, the image input/output processing module 23 operates hardware based on information inputted by an operation to a control panel managed by the control panel management module 21 so as to input document image of a reading object document set on a reading base by user.

The image input control module 24 controls entire processing for image input in the digital copier and executes processing on a document image inputted by the image input/output processing module 23 corresponding to information inputted by an operation of the control panel by the control panel management module 21. The image input control module 24 includes control panel/image correspondence determining module 24a and error processing determining module 24b and they operate as follows.

The control panel/image correspondence determining module 24 determines a document image transmission destination based on information generated upon input operation, inputted by the control panel management module 21, information specified with a button set on the control panel (hereinafter referred to as control panel button attribute) and one or more document images inputted by the image input/output processing module 23 and writes a document image into a transfer disk corresponding to a transmission destination via a data receiving agent 30 functioning on the DPPC control units 16a, 16b. Meanwhile, the document image can include a result of recognition (character code data) obtained by carrying out character recognition processing on the document image. In this case, an OCR module 30a carries out character recognition processing on the document image. Then, this recognition result is attached to the document image and transmitted to a transmission destination from a data receiving agent.

A registration condition of document image transmission destination is information generated upon input operation, content of a recognition result obtained from a document image and control panel button attribute if mentioned in the order of priority from its higher level. The control panel/image correspondence determining module 24 determines a document image transmission destination, that is, a transfer disk in which a document image is written (corresponding to a linking system) by applying information corresponding to each document image inputted via the image input/output processing module 23 according to this condition. In FIG. 5, "title" serves as a key word for retrieval. For example, "weekly report", "DATE", and "USER" are key words for retrieval. The number of the key words is determined by system. Therefore, for example in case where a document is to be sent from a document filing server 12b whose key word number is 7 to a document filing server 12a whose document key word number is 4, after three document key words are deleted in the data receiving agent 30, a document is transmitted. Further, if the key word is provided with a priority order, rearrangement of the key words is performed in the data receiving agent 30.

About an error generated prior to an end of reading operation to all documents whose image information is to be read, the error processing determining module 24b determines a destination for notification of the error generation corresponding to a timing of the error generation and notifies of the error by using an appropriate error notification means corresponding to this determination. The destination for notification of the error generation is a linkage server which is a transmission destination of the document image, job history data base 26 via the job history management module 25, and control panel of a digital copier via the control panel management module 21. An error which the error processing determining module 24b determines is an error generated in a series of processing from input of the document image to registration thereof.

The job history management module 25 stores a history of a job to be executed under a control of the image input control module 24 in the job history data base 26 and unless a linkage server to which a document image is to be transmitted is specified as a destination of transmission of the error generation, data about the content of the error is stored.

Next, a linkage system to which a document image inputted by the digital copier 11a (11b) is to be transmitted will be described. According to this embodiment, as shown in FIG. 2, the linkage destination of the digital copier 11a (11b) includes four systems such as a document filing server 36a (document filing servers 12a, 12b), E-mail server 36b (E-mail servers 13a, 13b), groupware server 36c (groupware servers 14a, 14b) and image handling application 36d (client PCs 10a, 10b).

Figure 14:
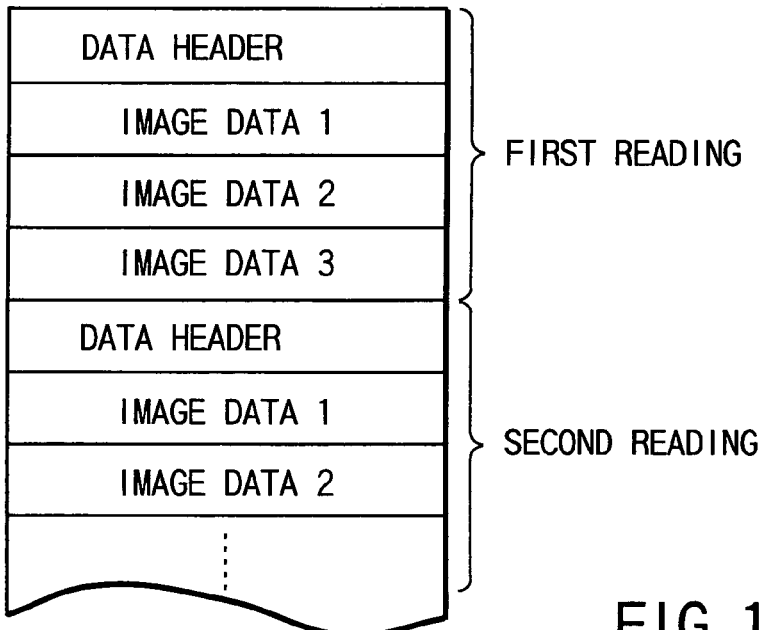
Figure 15:
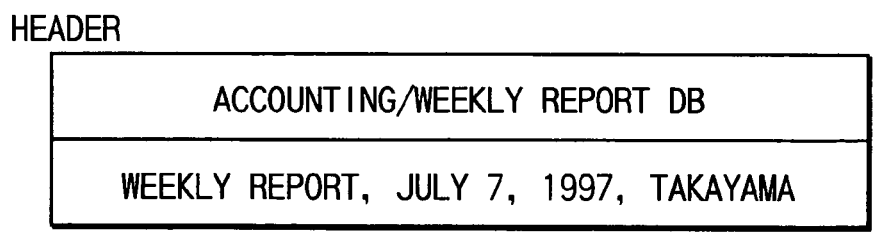
FIG. 15 is a diagram showing data to be stored in a header.

As the shared disk 18a (18b), corresponding to the linkage destination of the digital copier 11a (11b), a filing transfer disk 32a, an E-mail transfer disk 32b, a groupware transfer disk 32c, and a network scanner transfer disk 32d are provided. FIG. 14 shows data to be stored in the filing transfer disk 32a. As shown in the same Figure, data is stored in unit each time when a data header or image data is read. FIG. 15 shows data to be stored in the header. As shown in the same Figure, the header stores "accounting/weekly report DB" indicating registration/transmission destination and "weekly report, Jul. 7, 1997 TAKAYAMA" indicating a document tile name.

Further, in order to transmit data stored in each of the transfer disks 32a to 32d to a corresponding linkage system, a filing agent 34a, an E-mail agent 34b, a groupware agent 34c and a document transfer control module 34d (including document transfer agent 41) are provided.

The data receiving agent 30 and the agents 34a to 34c, 41 corresponding to each linkage system are included in for example, agent groups 17a, 17b of the DPPC control units 16a, 16b and realized on the DPPC control units 16a, 16b.

The data receiving agent 30 writes a document image received from the image input control module 24 of the digital copier 11a(11b) into any one of the filing transfer disk 32a, E-mail transfer disk 32b, groupware transfer disk 32c and network scanner transfer disk 32d corresponding to each system. A document transfer destination is determined corresponding to the registration condition of the previously described document image transmission destination.

In case where the digital copier is made to link with a filing system (document filing server 36a), a document image to be inputted can be automatically registered in a filing system. At this time, if control panel button attribute and document image are written into the filing transfer disk 32a, the filing agent 34a reads out these data, determines a title and registers it in the document filing system 36a.

Further, by transmitting an inputted document image to the E-mail server 36b via the E-mail agent 34b as an E-mail attachment file, it can be transmitted to any mail user from the E-mail server 36b. Further, a result of character recognition processing contained in the document image can be used as context data of an E-mail.

Further, the inputted document image can be registered in the groupware server 36c via the groupware agent 34c as data for electronic bulletin board.

It is possible to provide with the network scanner function so that an inputted document image can be read out via the document transfer control module 34d (document transfer agent 41) by an image edition application program to be executed by a client PC.

In the structure shown in FIGS. 1 and 2, a document image inputted through the digital copiers 11a, 11b is written into the shared disks (transfer disks) 18a, 18b by the data receiving agent 30 to be executed on the DPPC control units 16a, 16b and further, that data is read out by each of the agents 34a to 34c and 41 corresponding to a linkage system and then transmitted to an appropriate server. However, locations of the shared disks 18a, 18b and an execution position of each agent are not restricted to any particular one.

That is, any structure is permissible if the agents 34a to 34c, and 41 corresponding to each system can read a document image (including information relating to control panel button attribute) inputted via the digital copiers 11a, 11b from the transfer disk and transmit it to a corresponding linkage system.

For example, the shared disks 18a, 18b can be realized in a storage unit connected to the digital copiers 11a, 11b. Further, the transfer disks 32a to 32d corresponding to each system which is a transmission destination for the document image may be realized logically dividedly on a single storage unit or in storage units provided physically corresponding to each system (in this case, the storage unit may be place at any position). In case where the digital copier contains a transfer disk, the data receiving agent 30 is not required and the image input control module 24 may write a document image directly into a transfer disk corresponding to a document image transmission destination.

FIG. 3 shows a detailed structure of the document transfer control module 34d shown in FIG. 2. In this structure, the document transfer control module 34d transfers a document image inputted via the digital copiers 11a, 11b to the image handling application 36d by using the network scanner function. In addition to the network scanner transfer disk 32d, other user's data disk is provided so as to control data to be transferred to the image handling application 36d with two stages.

For example, in an example shown in FIG. 3, a user X's network scanner disk 43a for user X's and user Y's network scanner disk 43b for user Y are provided. Reading is made into the user network scanner disks 43a, 43b from the image handling applications 45a, 45b to be executed on, for example, the client PC 10a, 10b depending on user's intention. These user network scanner disks 43a, 43b are disk devices capable of storing data in a long term. On the other hand, the network scanner transfer disk 32d is capable of storing data in a relatively shorter time as compared to the user network scanner disks 43a, 43b.

The document transfer agent 41 determines that which user the document image stored in the network scanner transfer disk 32d is according to information obtained from the image input control module 24 and information stored in the user's disk control data base 42 and transfers the document image to an appropriate user network scanner disk (43a, 43b). The image handling applications 45a, 45b manage information read via the network scanner disks 43a, 43b as scanner libraries 44a, 44b.

Meanwhile, the network scanner disks 43a, 43b can be realized by a storage unit registered in each client PC used by user.

Although the shared disks 18a, 18b and transfer disks 32a to 32b are mentioned as information storage places shown in FIGS. 1 and 2, any type of the storage medium may be used.

Next, prominent characteristics (1) to (6) of the document input system according to this embodiment will be described individually.

(1) First, a method will be described in which a correspondence between information generated upon an operation for input of a document, control panel button attribute set preliminarily and read document image is made, a transfer disk to an agent coinciding with a control panel button attribute specified by user upon input of a document is specified, and title is extracted from these three kinds of information so as to write the input document image.

Figure 4B:
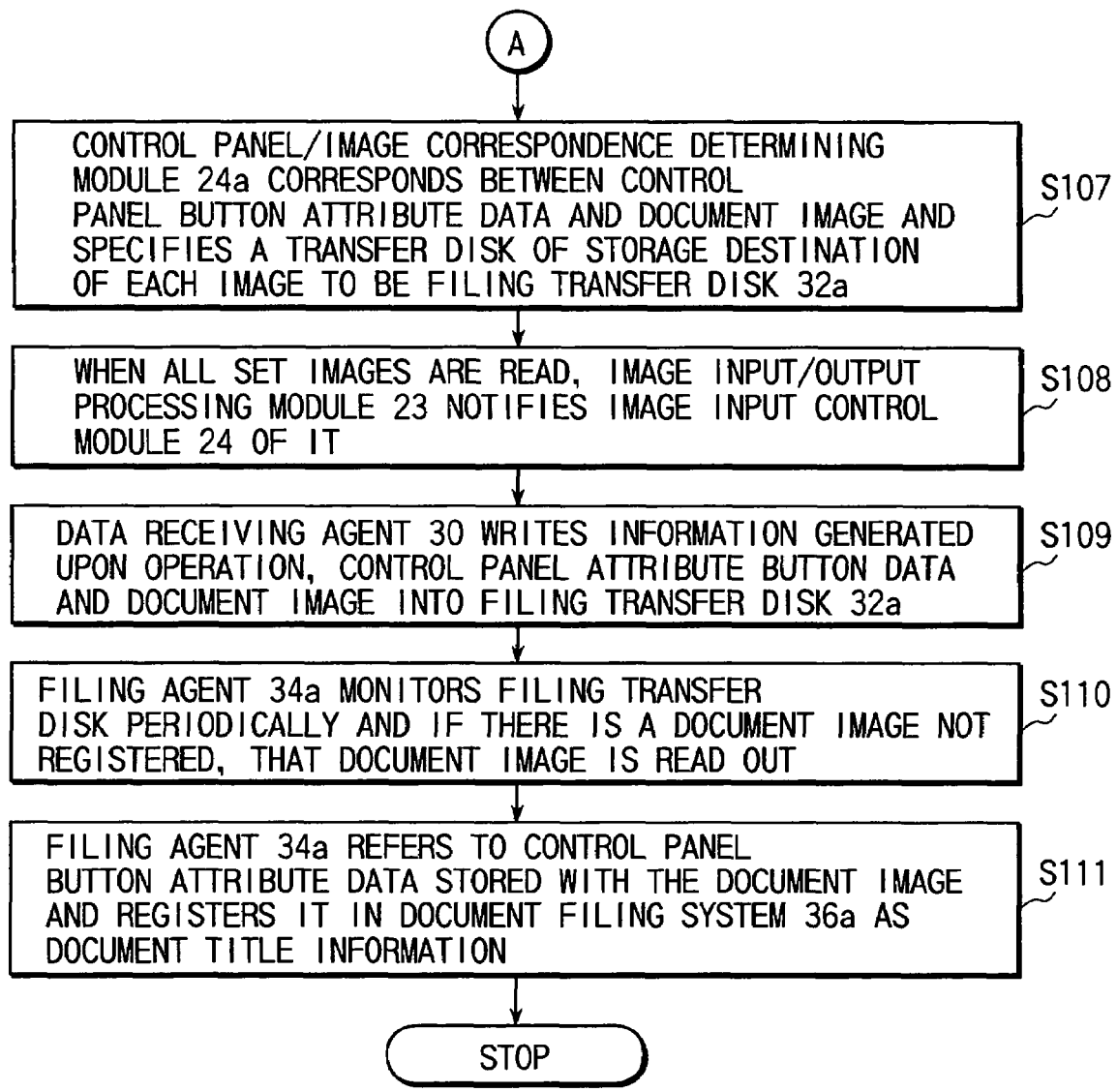

With reference to flow charts shown in FIGS. 4A, 4B and 13, an operation from input of the document image to registration in a filing system will be described about an example in which the document filing server 36a (filing system) is a linkage system.

Figure 13:
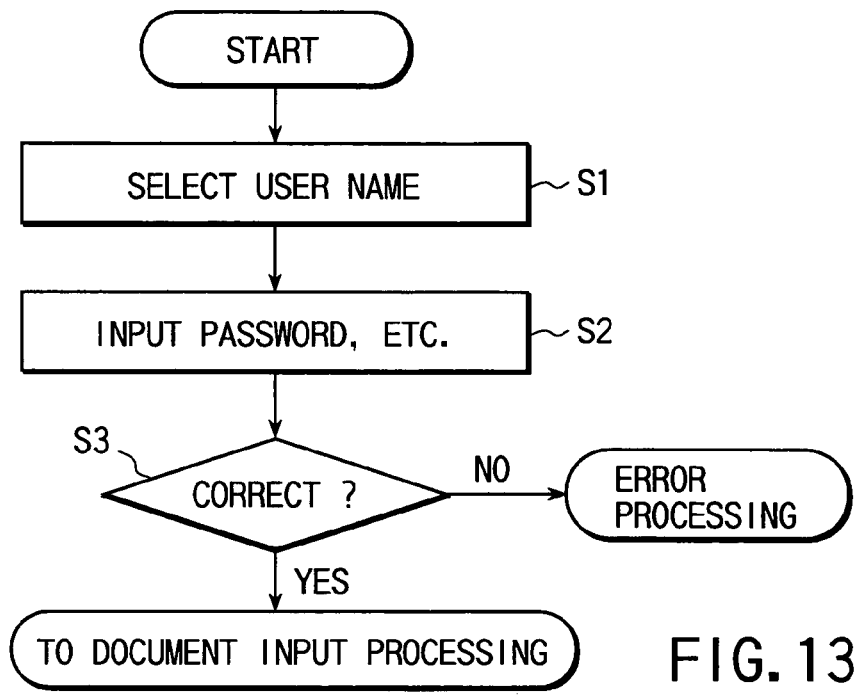
FIG. 13 is a flow chart for explaining user registration.

First, if user wants to use the digital copier 11a (11b), as shown in FIG. 13, a user name is selected from user list (S1). Next, such certification information as password and group name is inputted (S2). Then, whether or not the inputted certification information is correct is determined (S3). If it is determined correct, the processing proceeds to document input processing shown in FIGS. 4A and 4B.

On the other hand, if it is determined not correct in S3, it is determined that user is not a normal user and error processing is carried out. The input processing of the user name and certification information shown in FIG. 13 is carried out to specify a user in case where the digital copier is used initially.

Next, an operation from the input of the document image to registration in the filing system will be described with reference to a flow chart shown in FIGS. 4A and 4B.

First, a paper document which is an object for registration is placed on a reading base of the digital copier 11a (11b) and a control panel for filing registration is specified. If specification of the control panel for filing registration is inputted, the control panel management module 21 reads out information of the specified control panel from the control panel profile data base 22 and sets it up in the control panel (not shown).

For example, information shown in FIG. 5 is registered in the control panel profile data base 22. A panel number (panel #), button number (button #), transfer agent corresponding to a linkage system, registration destination/transmission destination of the document image and information indicating definition of title are registered in correspondence therebetween.

Each button set in the control panel is determined by a combination of a panel number and button number. Each button contains a transfer agent to which each information registered in the control panel profile data base 22 is to be transmitted when that button is selected, information about destinations for registration and transmission of the document image by the transfer agent and a title for use in processing by the agent.

For example, if a panel number 1 is specified when information shown in FIG. 5 is registered in the control panel profile data base 22, the control panel management module 21 reads out information about filing registration control panel (corresponding to panel number 1) from the control panel profile data base 22 and displays a screen shown in FIG. 6 on the control panel (step S102).

FIG. 6 shows a display example of the control panel corresponding to the panel number 1 in the data base shown in FIG. 5. In this control panel, any one of two buttons can be selected as a transmission destination of the document image by operating. First, there are provided a button 61 (button by button number 1 of panel number 1) for reading a document image as "accounting weekly report" and registering it in the filing system and a button 62 (button by button number 2 of panel number 1) for transmitting an E-mail under a sending address of "foo@bar.org". Further, the control panel includes a start button 63 for instructing an execution of a processing, a guide display region 64 for explaining an operating method and various messages and a reset button 65 for releasing the selection of the button.

Figure 7:
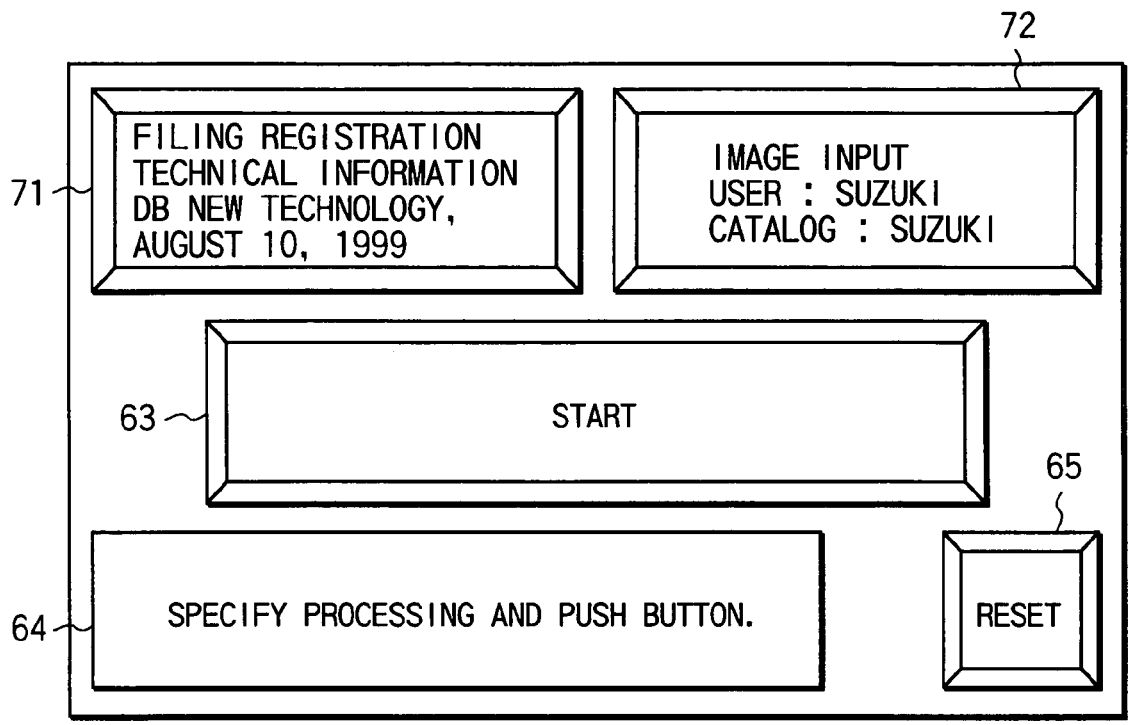
FIG. 7 is a diagram showing an example of a control panel corresponding to panel number 2.

If the panel number 2 is specified, a control panel shown in FIG. 7 is displayed based on information registered in the control panel profile data base 22. In a control panel shown in FIG. 7, a button 71 (button by button number 1 of panel number 2 shown in FIG. 5) for reading a document image as "technical information" and registering it in the filing system and a button 72 (button by button number 2 of panel number 2) for transmitting the document image to user X as "catalog" are provided.

If any one of buttons 61, 62, 71, 72 for selecting a processing shown in FIGS. 6 and 7 is selected and a start button 63 is depressed, the digital copier 11a (11b) executes a specified processing. Here it is assumed that the button 61 shown in FIG. 6 "filing registration: accounting/weekly report" is selected (step S103) and further, the start button 63 is depressed (step S104).

Then, the control panel management module 21 reads out information preliminarily set corresponding to the specified button 61 from the control panel profile data base 22 and transfers it to the image input control module 24 as control panel button attribute (step S105). In this control panel button attribute, a content of processing for the read document image is described. For example, if a button of panel number 1 and button number 1 in FIG. 5 is depressed, the read document image is transferred to the filing agent 34a and the agent registers it in the accounting/weekly report information document data base of the document filing server 36a.

Upon registration of the document image, the control panel management module 21 generates "weekly report<today's date>" based on a definition "weekly report, DATE, USER" of a title registered in the control panel profile data base 22 with correspondence to panel number 1 and button number 1 and transfers it to the image input control module 24. That is, information generated upon input operation is transferred to the image input control module 24.

"DATE" in the definition of the document title is set up by reading date data from a clock function provided in the digital copiers 11a (11b). Therefore, time information as well as date can be included. "USER" in the definition of the document title is specified by displaying an additionally registered user list in the control panel and then selecting it from the list. In addition to "DATE" and "USER", other information can be used as information generated upon input operation. For example, arbitrary certification information (password) can be attached to the inputted document image.

On the other hand, the image input/output processing module 23 reads a paper document mechanically (optical scanning) which is an object for reading and transfers the read document image to the image input control module 24 (step S106). At this time, the image input/output processing module 23 transfers the document image of each page to the image input control module 24. Meantime, a document image transferred to the image input control module 24 may contain a recognition result (character code string) obtained by carrying out character recognition processing on a read image.

The control panel/image correspondence determining module 24 specifies a transfer disk in which each document image is to be written based on information generated upon input operation and the content of the control panel button attribute.

For example, in case where the button 61 shown in FIG. 6 is depressed, "filing" is registered as a transfer agent corresponding to the button 61 and "accounting weekly report DB" is registered as a destination for registration and transmission (see FIG. 5). Thus, the control panel/image correspondence determining module 24 specifies a destination for writing the document image to be the filing transfer disk 25a (step S107).

Processings of steps S105 and S106 can be carried out in parallel. In this case, when reading of the document images of all paper documents set for reading ends, the image input/output processing module 23 notifies the image input control module 24 of that end (step S108). On the other hand, if write into the transfer disk is carried out after reading of all the paper documents is completed, it comes that reading of all the paper documents ends in step S108. Thus, the processings of step S108 and step S106 are carried out at the same time.

The image input control module 24 writes information about initialization of operation and control panel button attribute, which are sent from the control panel management module 21 and document image from the image input/output processing module 23 into the filing transfer disk 32a via the data receiving agent 30 (step S109).

On the other hand, the filing agent 34a periodically monitors the filing transfer disk and if there is any document image not registered, picks it out (step S110).

Subsequently, the filing agent 34a refers to control panel button attribute stored with the document image and information generated upon input operation, generates title based on this information and registers that title with the document image in the document filing system 36a (step S111).

In a process of registration processing to the document filing server 36a (filing system), by only operating the control panel of the digital copier 11a (11b), an inputted document image can be transmitted to a server which is a particular transmission destination such as a filing system. Further, by only operating the control panel, the title can be generated by using information generated upon operating the digital copier such as operation date and user name and information recorded as an attribute of the control panel button upon system design. Therefore, the necessity of inputting information each time through the key board like at the time of document image filing in an ordinary filing system is eliminated, thereby facilitating the operation for filing.

(2) Title for the document image is determined at the time of link with the document filing server 36*a* (filing system) in the following priority order (down from the highest).

Information generated upon input operation (user name, operation date, group name, certification information and the like)

Certification result of read document image

Control panel button attribute

The title for use upon registration of a document in the filing system uses the above three kinds of generation sources. It can be considered that data of the same kind is contained in a plurality of generation sources. For example, although a registered user name is generally obtained actually from an operator upon input operation, there is a possibility that as a result of character recognition in the document image read by the digital copier 11*a* (11*b*), a name which should be used as a registered user name exists therein. Further, as the attribute of the control panel button, there is a possibility that a user name which should be specified as default when that button is selected is included at design stage.

When the filing agent 34*a* determines title of a document to be registered in the filing system, if overlapping information is obtained from these three kinds of generation sources (in case where they are stored in the filing transfer disk 32*a*), firstly, information generated upon input operation is adopted with the top priority, then a recognition result of a read document image is adopted and if there is no information which falls under these informations, information set up as the control panel button attribute is employed so as to produce title. If there is no information which falls under any, the filing agent 34*a* produces the title by using information preliminarily held internally as default (for example, date, user name or the like).

By using information obtained from three kinds of the generation sources according to the priority order, appropriate title can be set up even by a simple operation to the control panel.

(3) In order to link with plural systems, data transfer agents 34*a* to 34*c*, and 41 corresponding to each system and shared disk (transfer disk) corresponding to each agent are provided. The digital copier 11*a* (11*b*) specifies the shared disks (transfer disks 32*a* to 32*d*) to be stored according to the control panel button attribute and information generated upon input operation so as to carry out a processing. An agent meeting each system periodically monitors a corresponding shared disk and if there is stored a document image therein, registers it in a system specified as a transmission destination for the document image.

As shown in FIG. 2, in a document input system according to this embodiment, four transfer disks 32*a* to 32*d* are provided to transmit a document image to four kinds of the systems and agents 34*a* to 34*c*, and 41 corresponding to each of the four kinds of systems are provided.

Because the agents 34*a* to 34*c*, and 41 are provided corresponding to a system which is a transmission destination for the document image, even if the number of the digital copiers for inputting the document image changes, a processing for the document image inputted via each digital copier is carried out commonly. Further, because the transfer disks are provided for each agent, even if the number of the digital copiers changes, the number thereof does not need to be increased correspondingly.

Figure 8:
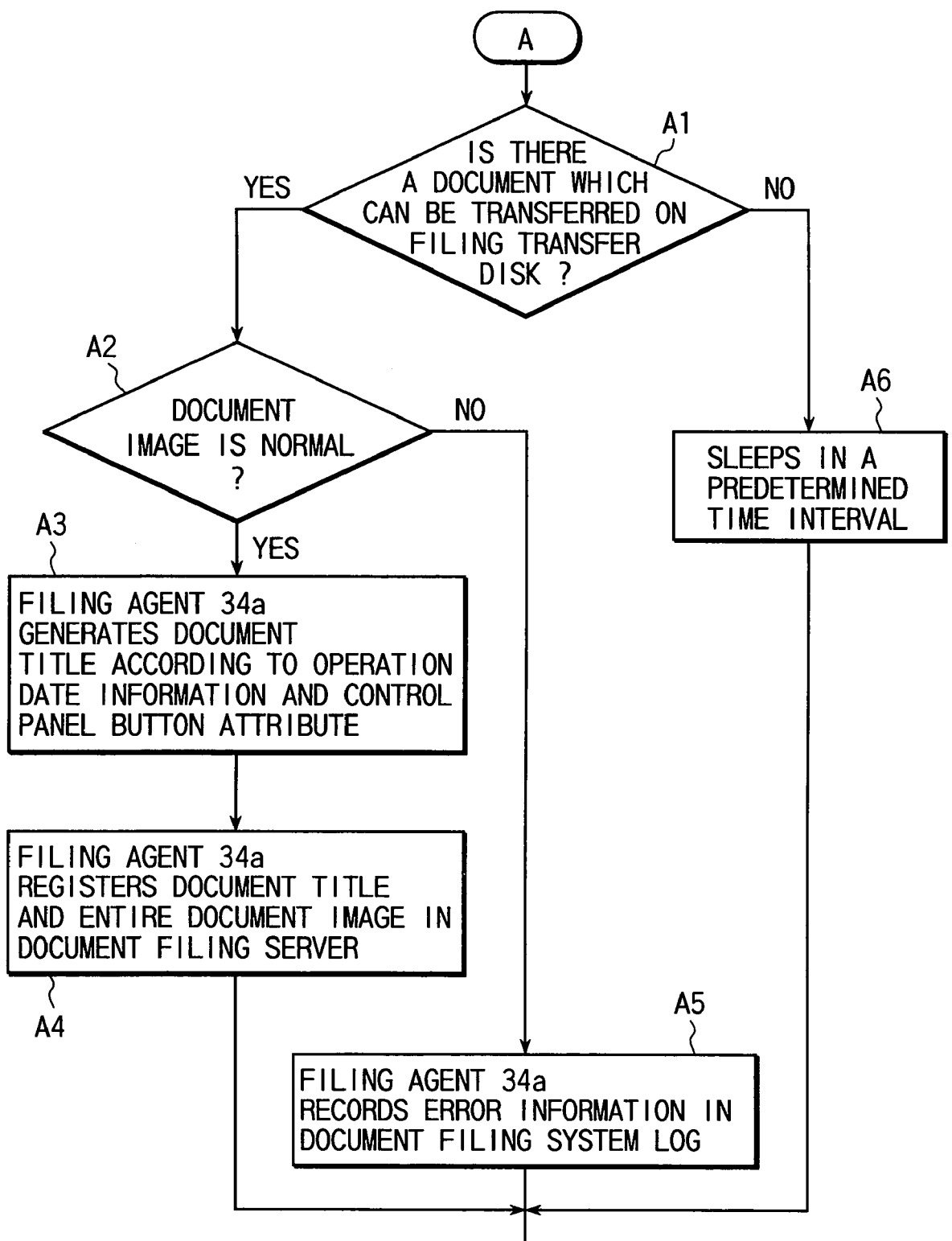

FIG. 8 shows a flow chart for explaining a processing of the filing agent 34*a*.

The filing agent 34*a* determines whether or not a document image is stored periodically in the filing transfer disk 32*a* (step A1) and if there is a document image which should be registered, whether or not a reading condition of that document image is normal is determined (step A2).

If the reading condition is normal, the filing agent 34*a* generates a title based on the control panel button attribute and information generated upon input operation (for example, information of operation date) (step A3).

The filing transfer disk 32*a* registers this generated title in the document filing server 36*a* (filing system) as a document title of the document image (step S4). The title is set up in the previously described manners (1) and (2).

If the reading condition of the document image stored in the filing transfer disk 32*a* is not normal and an error information is recorded in the filing transfer disk 32*a* (step A2), the filing agent 34*a* registers the error information (indicating an error message or the like) in an operation record (log file) of the document filing server 36*a* (step A5). A detail of the operation when an error occurs will be described later.

The filing agent 34*a* carries out the above operation at every interval of a predetermined time (step A6).

In the above manner, the transfer disks 32*a* to 32*d* are provided corresponding to a system which is an transmission destination of the document image and further the agents for transmitting the document image stored in the transfer disk with the title to an appropriate system are provided corresponding to the respective transfer disks 32*a* to 32*d*. Therefore, an operation upon inputting the document image via the digital copier 11*a* (11*b*) can be simplified. That is, the digital copier 11*a* (11*b*) requires only button selection with respect to the control panel and a generally necessary operation for registration of the document image in a system of transmission destination, such as specification of a transmission destination of the inputted document image, input of title and the like can be eliminated. By only inputting the document image to the digital copier 11*a* (11*b*) by an ordinary operation, the document image can be registered in various systems such as a filing system.

Although in the above explanation, a case where the document image is transmitted to the document filing server 36*a* has been described, the E-mail agent 34*b*, groupware agent 34*c*, and document transfer agent 41 basically perform the same operation. That is, periodically a corresponding transfer disk is accessed and if there is stored information which should be transmitted, that information is transmitted to a system of transmission destination.

(4) A plurality of disks (storage means) are provided until the document image is transferred to the image handling application 36*d* and a maximum storage time (maximum time for which data can be stored) is set up for each. The document images are stored in order from one whose maximum storage time is the shortest. Before a time limit is reached, the document transfer agent 41 transfers to a disk having the second longest maximum storage time.

In the structure of this embodiment shown in FIGS. 2 and 3, for the document image to be transmitted to the image handling application 36*d*, the network scanner transfer disk 32*d* and network scanner disks (43*a*, 43*b*) are provided. In this case, the maximum storage time of the network scanner transfer disk 32d is shorter than that of the network scanner disks 43a, 43b provided for each user.

Only the document transfer agent 41 is capable of reading from the network scanner transfer disk 32d. The document transfer agent 41 periodically accesses the network scanner transfer disk 32d at a timing that a document image stored in the network scanner transfer disk 32d does not exceed its maximum storage time and if a document image is stored, determines a user name which is a registration/transmission destination of the document image, for example, user X, based on the control panel button attribute corresponding to this document image (see FIG. 5).

The document image reading timing by the document transfer agent 41 with respect to the network scanner transfer disk 32d is appropriately set up not so as to exceed the maximum storage time based on the number of digital copiers for storing a document image into the network scanner transfer disk 32d, the number of users which are transmission destinations of the document image and other conditions.

The document transfer agent 41 writes the document image and other information into a disk determined according to a registration/transmission destination of the control panel button attribute, for example, user X's network scanner disk 43a for user X.

On the other hand, the network scanner disks 43a, 43b provided at each user can be accessed from the image handling applications 45a, 45b corresponding to the users X, Y.

Because, for example, the image handling application 45a reads a document image stored in the user X's network scanner disk 43a corresponding to an instruction arbitrarily provided from the user, it is capable of storing data for a long time.

By using the network scanner transfer disk 32d having a relatively short maximum storage time, respective document images are read out in succession by the document transfer agent 41 within the maximum storage time even if document images inputted from a plurality of the digital copiers are stored. Therefore, a storage region having a capacity larger than necessary is not required. Further, by providing with the network scanner disks 43a, 43b for each user, user can access them at an arbitrary timing.

Although in a structure example shown in FIG. 3, in addition to the network scanner transfer disk 32d, other network scanner disks are provided for each user so as to transfer the document image through two stages, it is permissible to provide with the storage means so as to transfer the document image through three or more stages. In this case, as described above, the maximum storage time for the storage means of each stage is set up in order from the network scanner transfer disk 32d so that the storage time decreases in succession.

Although in the above description, the filing transfer disk 32a and the network scanner disks 43a, 43b are provided for the image handling application, the document filing server 36a, E-mail server 36b, and groupware server 36c may be provided with a storage means having a longer maximum storage time than their corresponding transfer disks.

(5) An error generated before all the reading operation for the document image is terminated is displayed on an input device (digital copiers 11a, 11b) and an error generated after the reading operation for all the document images is terminated is notified to a system which is a transmission destination of that document image.

Figure 9:
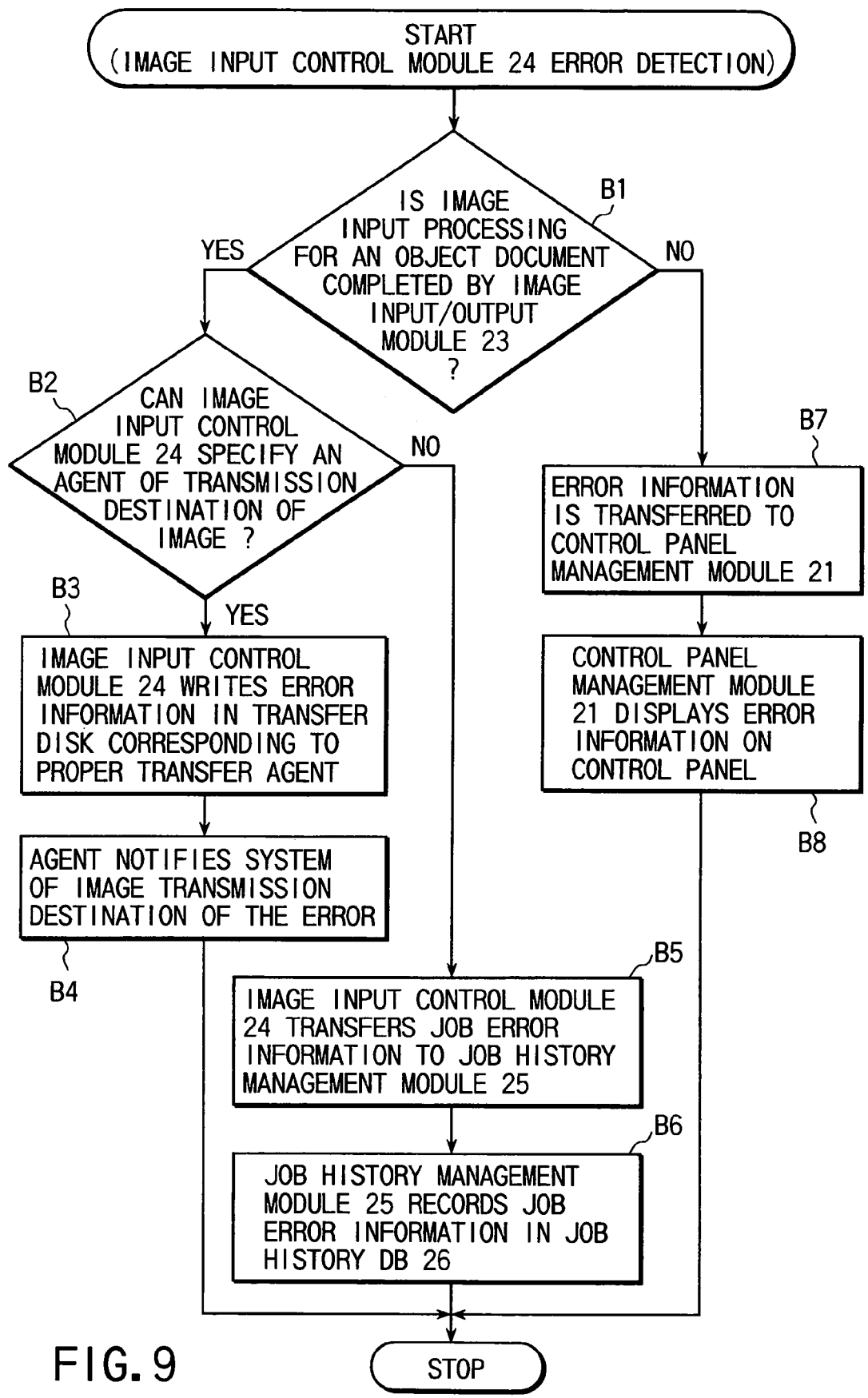
FIG. 9 is a flow chart for explaining a processing for a case in which an error processing determining module 24a detects an error.

FIG. 9 shows a flow chart for explaining a processing in a case where the image input control module 24 (error processing determining module 24b) detects an occurrence of error.

First, when an error is detected, the error processing determining module 24b of the image input control module 24 determines whether or not document images in a paper document set up by the image input/output processing module 23 as an object of processing has been completely inputted (step B1).

Here, if the input of the document image has not been completed, the image input control module 24 transfers error information to the control panel management module 21 (step B7). The control panel management module 21 makes the control panel display a predetermined message for notifying of the occurrence of the error depending on the error information from the image input control module 24 (step B8).

Figure 10:
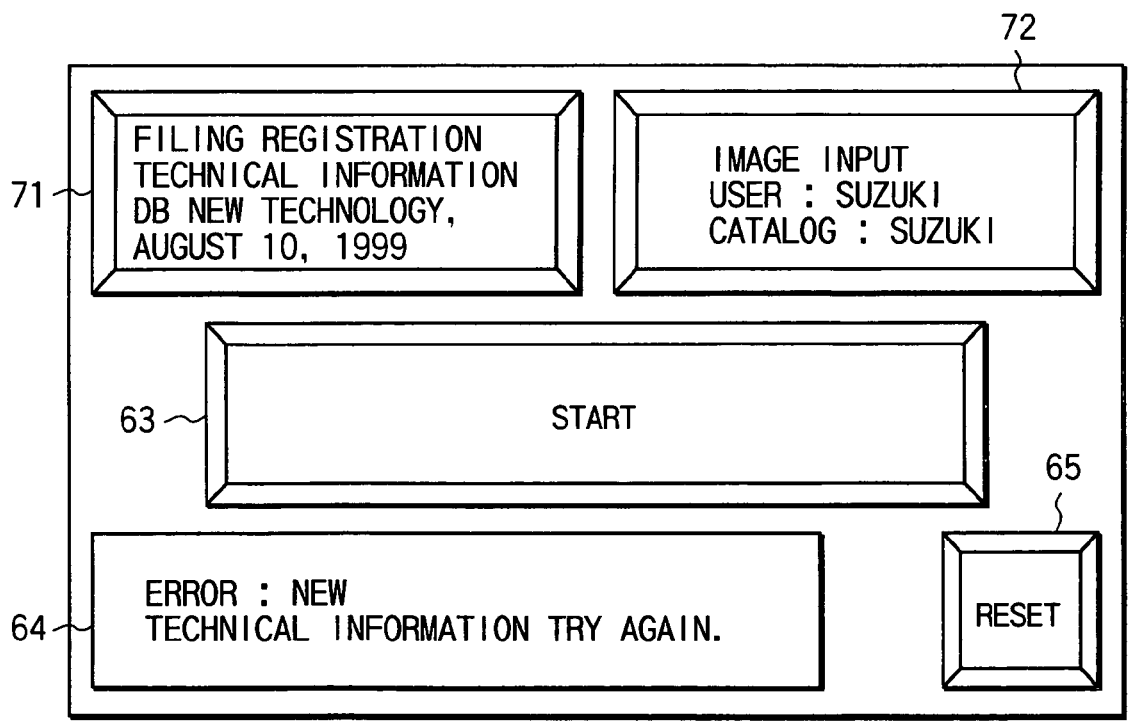
FIG. 10 is a diagram showing an example in which an error message is displayed in a guide display region 64 of a control panel.

FIG. 10 shows an example in which an error message is displayed in the guide display region 64 of the control panel.

FIG. 10 shows a control panel of control panel number 2, in which because an error is generated in a processing instructed with a button 71 for registering in the filing system, a message saying "TRY AGAIN" as a recommended operation is displayed with a title "new technical information" specified with the button 71.

Usually the digital copier 11a (11b) for use in inputting the document image is shared by a plurality of users. Therefore, after a necessary processing for a use is terminated, the digital copier is opened to other user. However, if an error occurs before input of a document image of all a document which is an object for processing is completed, there is a possibility that the user stands without leaving the digital copier 11a (11b). Therefore, by displaying an error message on the control panel of the digital copier 11a (11b), it is possible to notify the user operating for input of the document image of the occurrence of the error securely, so that the user can be urged to input the document image again.

On the other hand, if the input of the document image has been completed, the error processing determining module 24b determines whether or not an agent corresponding to a transmission destination of the document image can be specified based on the control panel button attribute corresponding to the inputted document image and information generated upon input operation (step B2).

If an agent can be specified, the error processing determining module 24b writes error information into a transfer disk corresponding to a proper transmission destination agent (step B3). For example if the transmission destination of an inputted document image is the document filing server 36a, the error processing determining module 24b writes error information into the filing transfer disk 32a.

If error information is written in the filing transfer disk 32a, the filing agent 34a notifies the document filing server 36a specified as a transmission destination of the document image of the occurrence of the error (step B4).

The document filing server 36a records the occurrence of the error corresponding to a notification from the filing agent 34a. In this case, a condition enabling to recognize a job in which the error occurred has been attained based on information generated upon input operation and control panel button attribute.

If input of the document image is completed and an agent corresponding to a transmission destination of the document image cannot be specified (step B2), the error processing determining module 24b transfers job error information to the job history management module 25 (step B5). The job history management module 25 records job error information from the error processing determining module 24b in the job history data base 26 (step B6).

If input of a document image which is an object for processing has been completed, as described previously, the digital copier 11a (11b), which is shared by a plurality of users, is opened to other user and then a user who completes the input operation leaves the digital copier 11a (11b).

Thus, even if an error message is displayed on the control panel of the digital copier 11a (11b), it is difficult to notify the user who already has completed the input operation of that occurrence of the error.

Alternatively, according to this embodiment, an error generated after the input operation of the document image is completed can be recorded in a system of the transmission destination of that document image or job history data base 26 of the digital copier 11a (11b).

Thus, the user who completes the input operation of the document image can read out a job history recorded in the job history data base 26 of the digital copier 11a (11b) so as to recognize whether or not any job error occurred.

Further, the user can access the digital copier 11a (11b) from his client PC through network to read out the job history and recognize whether or not any error occurred or access a system of the transmission destination of that document image so as to recognize whether or not it has been notified of an occurrence of an error by the digital copier 11a (11b) about a job specified based on information generated upon input operation or control panel button attribute.

FIG. 11 shows an example of document reading dialog displayed by the image handling application 36d. If an error occurs in document reading as shown in FIG. 11, "error" is displayed as information about a state corresponding to that document.

Figure 12:
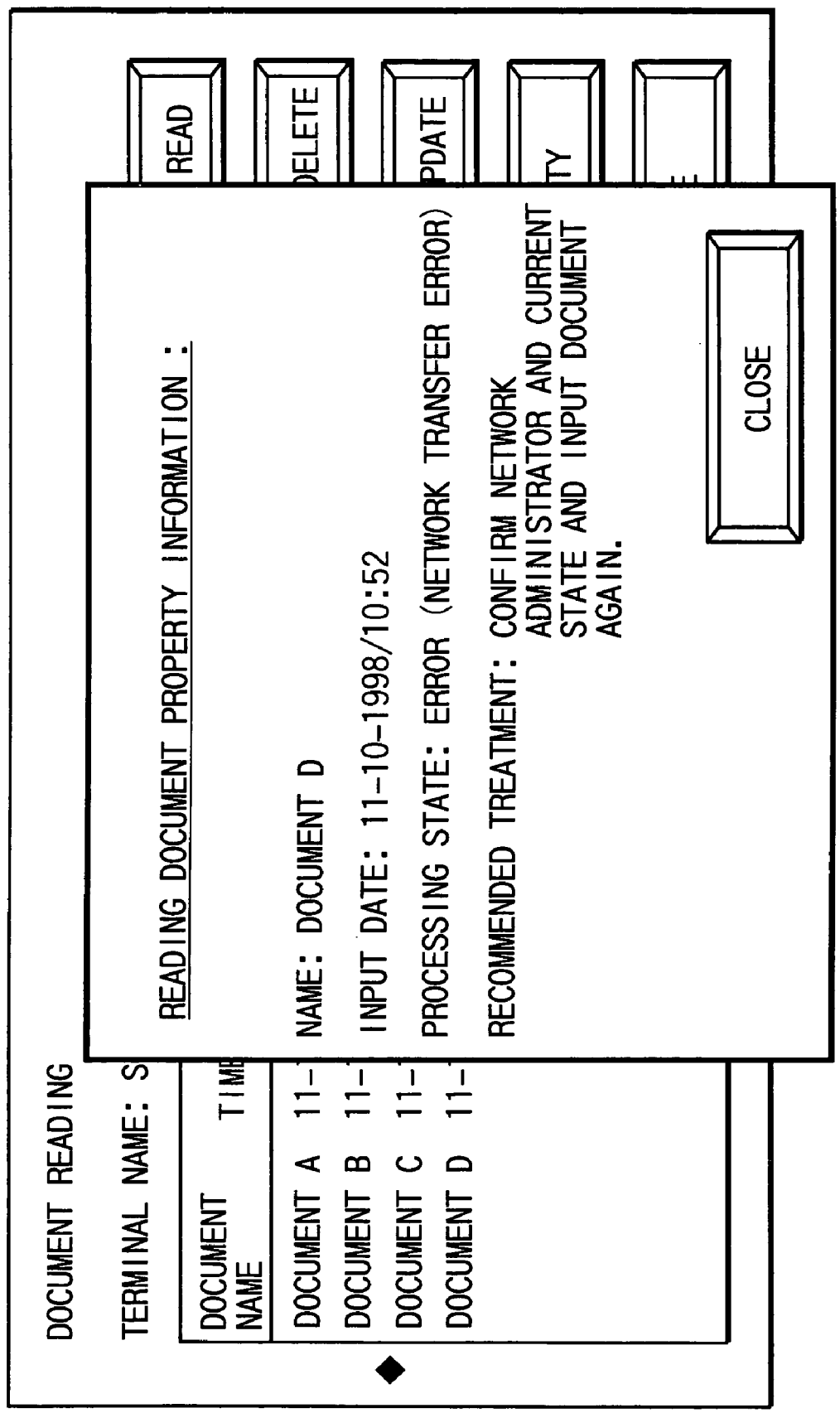
FIG. 12 is a diagram showing an example in which when an error occurs in system linkage processing, information related to the error is displayed on a dialog screen by the image handling application 36d.

FIG. 12 shows a case in which when an error occurs during system linkage processing, information about the error is displayed in a dialog screen by the image handling application 36d. In the example shown in FIG. 12, information generated upon input operation, which is obtained upon the input operation of the document image and a document name and input date based on control panel button attribute are displayed and additionally, a processing state for notifying of the error generating condition and a message for notifying a recommended treatment are also displayed. The processing state and recommended treatment are discriminated by, for example, the error processing determining module 24b and notified to a linkage system as error information.

If an occurrence of an error is detected, the error processing determining module 24b is capable of requesting the E-mail server 36b through the E-mail transfer disk 32b and E-mail agent 34b to send an E-mail for notifying a particular person such as a user who completes the input operation of the document image about the occurrence of error. In this case, the error processing determining module 24b specifies an E-mail address of a user (preliminarily registered in the digital copier or inputted upon an input of document image) with the content of the error occurrence (for example, content of read document property shown in FIG. 12) as a context and requests for transmission of the E-mail.

Consequently, because, in a processing for linking with other system after a document image is inputted, the error occurrence is notified as an E-mail even if user does not recognize intentionally whether or not any error occurs, burden on the user can be reduced.

If the reading processing is not completed at a time when the reading processing of a document image of all pages required to be read upon registration of the document will be completed, a message for notifying of an occurrence of an error is displayed on the control panel of the digital copier 11a (11b). If the reading processing is completed, it is possible to notify the user of the occurrence of an error by recording error information in the job history data base 26 or a linkage system. That is because the notification of the error occurrence can be carried out depending on the condition, the user can grasp the situation securely and effectively.

(6) Continuous specification of the same button in the control panel of the digital copier 11a (11b) is treated as additional registration of the same document into a page until rest is instructed or time out is reached. The reset key action includes two stages, that is, page continuous reset and overall reset.

Hereinafter, a control panel shown in FIG. 6 will be described. For example, it is assumed that a document image to be treated as weekly report document is inputted using a button 61 "filing registration: accounting/weekly report". If a paper document is set up by user and the button 61 is selected and then pressed, the image input control module 24 executes a processing for registering a document image obtained from the set paper document into the document filing server 36a (filing system) as accounting/weekly report.

Just after the document image is registered, the image input control module 24 is in "additional registration model". That is, if another paper document is set up and the button 61 "filing registration: accounting/weekly report" is selected and then a start button 63 is pressed, the image input control module 24 treats a document image inputted from the image input/output processing module 23 as a series of document and executes a processing for registering that document image in a page next to the document image already registered in the document filing server 36a.

However, if a predetermined time passes since an initial registration operation is completed (time out) or a reset button 65 is depressed, the image input control module 24 releases "additional registration mode". If a registration into the document filing server 36a is instructed with the button 61 in a condition in which the "additional registration mode" is released, the image input control module 24 executes a processing for registering a new document in the document filing server 36a as a document image.

Because management of an inputted document image in a linkage system can be controlled by only operating the control panel of the digital copier 11a (11b), operating efficiency for additional registration and the like can be improved.

Next, a document input system according to other embodiment of the present invention will be described.

Figure 16:
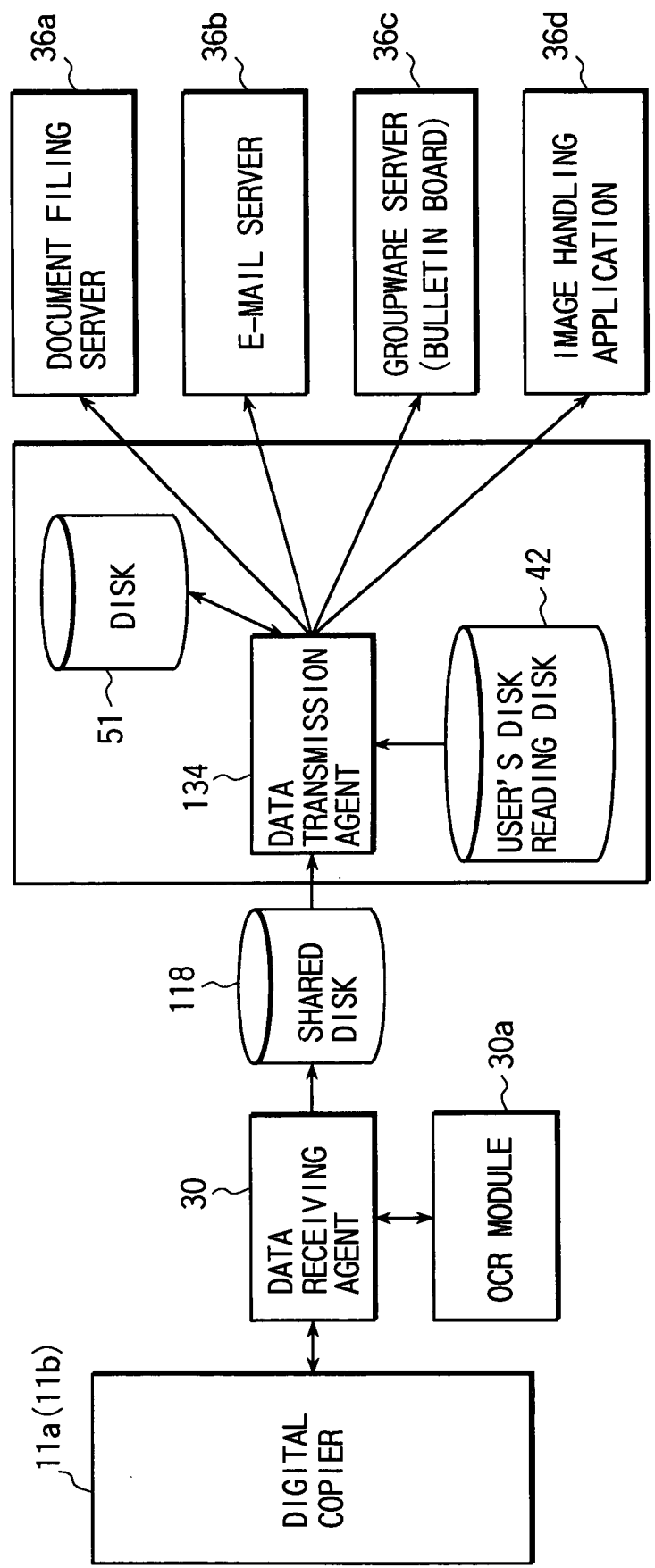
FIG. 16 is a diagram showing document input system according to other embodiment of the present invention.

FIG. 16 is a diagram showing a document input system according to another embodiment of the present invention. In the same Figure, the same reference numerals are attached to the same parts as in FIG. 2 to simplify a description thereof.

The document input system of this embodiment is different from the document input system shown in FIG. 2 in that data sent by the data receiving agent 30 is managed by a single shared disk 118 and that a function of data transmission agent 134 and disk 51 are provided additionally.

Figure 17:
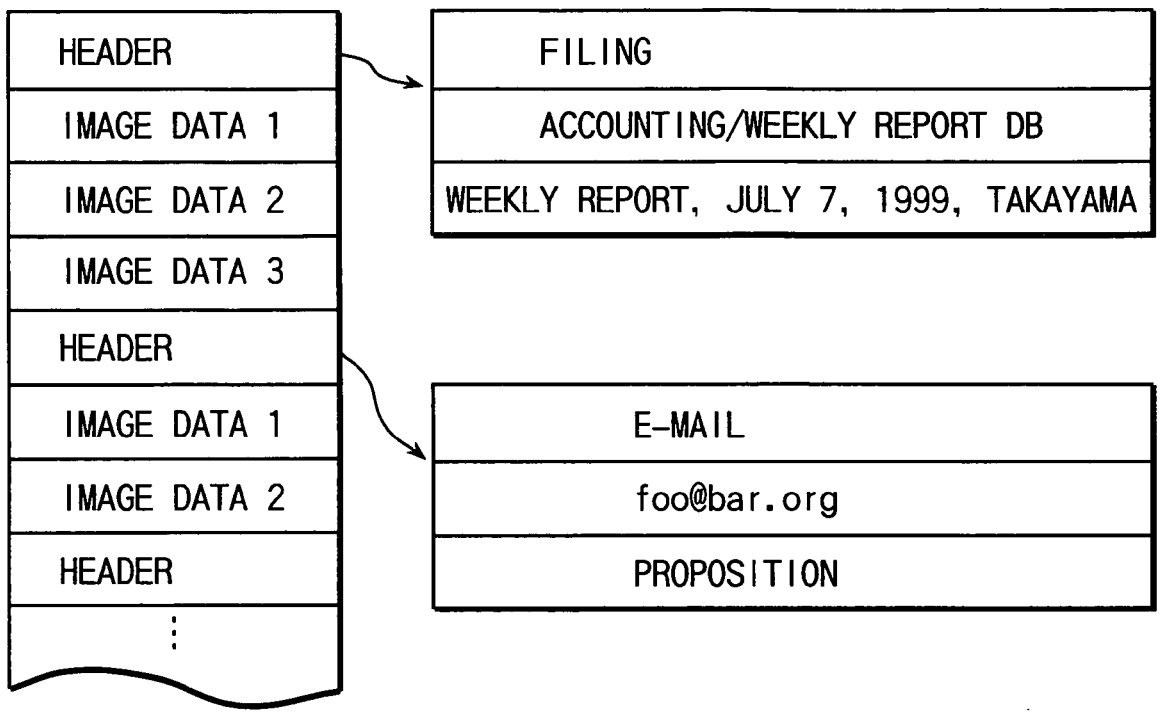
FIG. 17 is a diagram showing data to be stored in a shared disk 118.

The shared disk 118 stores data transmitted from the data receiving agent 30 in succession. FIG. 17 is a diagram showing data to be stored in the shared disk 118.

Then, data stored in this shared disk 118 is transmitted to the data transmission agent 134.

The data transmission agent 134 carries out any one of the following three operations.

(1) A case of transmitting data to a transmission destination after data is stored in the disk 51

Figure 18:
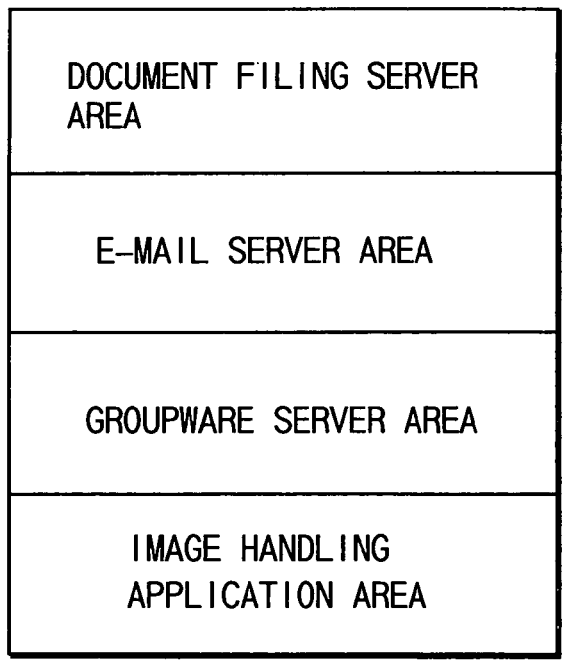
FIG. 18 is a diagram showing data region of data to be stored in a disk.
Figure 19:
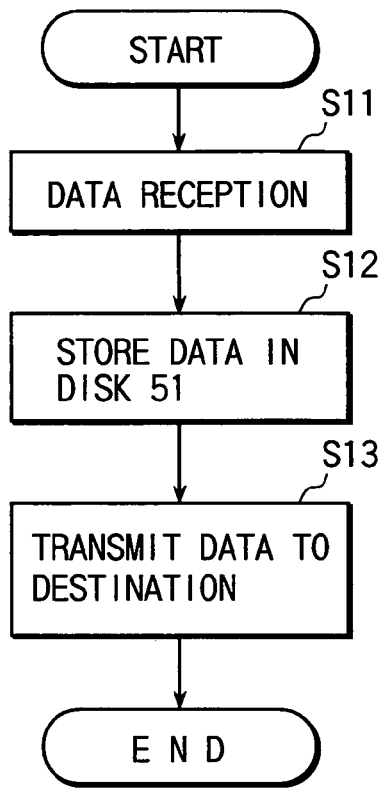
FIG. 19 is a flow chart for explaining an operation of the document input system according to other embodiment of the present invention.

Then, a flow chart shown in FIG. 19 will be described. If the data transmission agent 134 receives data from the shared disk 118 (S11), data is temporarily stored in the disk 51 (S12). FIG. 18 shows data region of data stored in the disk. The disk 51 contains storage areas specialized for each transmission destination and the data transmission agent 134 distributes received data to each transmission destination and stores it in the disk 51. The data storage time of the disk 51 is longer than the data storage time of the shared disk 118.

Next, according to information stored in the user's disk management data base 42 and information obtained from the image input control module 24, a transmission destination is determined and data is transmitted to that transmission destination (S13).

(2) A case in which data is stored in the disk 51 as required

Figure 20:
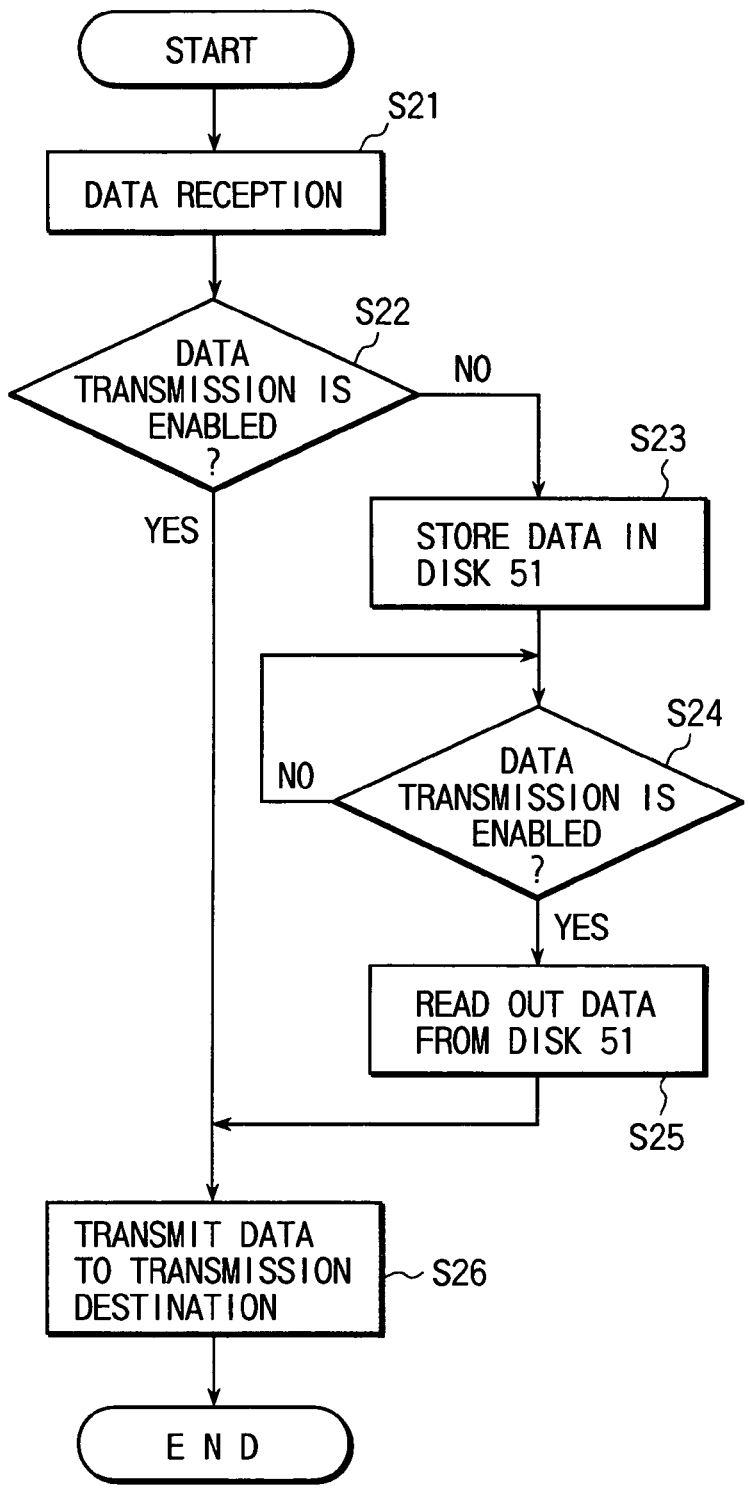
FIG. 20 is a flow chart for explaining an operation of the document input system according to other embodiment of the present invention.

A flow chart shown in FIG. 20 will be described. As shown in FIG. 20, the data transmission agent 134 receives data from the shared disk 118 (S21). Next, the data transmission agent 34 determines whether or not data can be transmitted to the transmission destination (S22). The reason why this determination is carried out is that sometimes data cannot be transmitted for the reason that the transmission destination server is busy or the like.

If it is determined that data transmission is enabled in S22, the data transmission agent 134 transmits received data to a transmission destination based on information stored in the user's disk management data base 42 and information obtained from the image input control module 24 (S26).

On the other hand, if it is determined that data transmission is disabled, the received data is stored in the disk 51 (S23). Whether or not data can be transmitted again is determined (S24). If it is determined that the data can be transmitted again, the stored data is read from the disk 51 (S25) and received data is transmitted to a transmission destination according to information stored in the user's disk management data base 42 and information obtained from the image input control module 24 (S26).

(3) A case in which received data is directly transmitted to the transmission destination In this case, the data transmission agent 134 determines a transmission destination according to information stored in the user's disk management data base 42 and information obtained from the image input control module 24 and transmits received data to the transmission destination.

Therefore, because according to the document management system of this embodiment, a single transmission agent 134 controls data transmission, there is such an effect that the structure of the document management system is simplified in addition to an effect of the document management system shown in FIG. 2.

If data cannot be transmitted to the transmission destination, data is temporarily stored in the reading file 51 and if it comes that transmission is enabled, data is read out from the reading file 51 and this read data is transmitted again. Therefore, data can be transmitted securely to the transmission destination.

Methods mentioned in the above described embodiments can be written into, for example, magnetic disk (floppy disk, hard disk and the like), optical disk (CD-ROM, DVD and the like), semiconductor memory or the like as a program which can be executed by the computer and provided to various apparatuses. Further, they can be transmitted via communication medium and provided to each apparatus. The computer for realizing this unit reads a program recorded in the recording medium, receives a program via a communication medium and is controlled by that program so as to carry out the above processing.

According to the present invention, as described above in detail, to make the digital copier communicate with plural systems, a transmission module (data transmission agent) corresponding to each system is incorporated and a storage means (transfer disk) is provided in each transmission module and then, a storage means for storing the document image inputted by the digital copier is specified according to information inputted into the digital copier with the document image. The transmission means periodically reads out for a corresponding storage means and if there is stored a document image, registers it in a predetermined system. Consequently, in an environment in which a shared digital copier is used as an input machine, easy-to-use document image input is enabled.

Title is generated from information generated upon input operation of a document image (user name, operation time, group name and the like), preliminarily set control panel button attribute (data base of document registration destination, agent name and the like) and read document image (including a result of recognition) and a correspondence between the title and image information is made.

Further, according to the document management system of this embodiment, upon transmission of an inputted document image to a predetermined system, the transmitted document image passes plural storage modules and the maximum storage time (maximum time in which data is placed) is set up in each storage module. The transmitting module (data transmission agent) stores the document image in a storage module having the shortest maximum storage time and before its time limit is reached, the data is transferred to a storage module having the next shortest storage time. Consequently, each storage module can be made to function depending on application purpose, so that a storage module having the short maximum storage time is capable of storing document images from plural digital copiers and a storage module having a long maximum storage time allows access to a document image at any timing.

Further, according to the document management system of this embodiment, if an error occurs before the input of the document image is terminated, the occurrence of the error is notified to the aforementioned digital copier and if the error occurs after the input of the document image is terminated, the occurrence of the error is notified to a system which is a transmission destination of this document image.

If the digital copier provides various functions and is shared by a plurality of users, it is necessary to minimize an occupied time necessary for a single operation by user and maximize the sharing efficiency. Further, when the reading operation of a document image prepared by user is terminated, other devices need to be opened to other users and functions. Therefore, even before the inputted document image is actually registered in the transmission destination system, usually the user leaves the system when the reading operation is terminated. With this structure, if an error occurs during a processing before the input of a document image is terminated, that error is notified in the digital copier because the user often still stand near the digital copier for input operation of the document image. If an error occurs after the input of the document image is terminated, that error is notified to a transmission destination of the document image because the user often leaves the digital copier for the aforementioned reason. As a result, the occurrence of the error can be notified to the user effectively.

Further, according to the document management system of this embodiment, management of a system of a transmission destination of an inputted document image can be controlled by the operation for inputting the document image, that is, specification of reset or whether or not a predetermined time passes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A document input system comprising:
at least one digital copier for inputting a document image and information relating to the document image, the information including information about a transmission destination;
at least one system serving as a transmission destination of the document image inputted by the at least one digital copier;
storage means for storing the document image inputted by the at least one digital copier and the information relating to the document image, wherein the at least one digital copier generates a title for the document image based on priorities assigned, by the at least one digital copier, to the information relating to the document image inputted; and
transmitting means for periodically reading from the storage means to determine if the document image is stored in the storage means and, if so, transmitting the document image to one of the at least one system based on the information relating to the document image.

2. A document input system according to claim 1, wherein the storage means includes sub-storage means, provided so as to correspond to the at least one system respectively, for storing the document image and the information relating to the document image, and
the transmitting means includes sub-transmitting means, provided so as to correspond to the at least one system respectively, for transmitting the document image to one of the at least one system based on the information relating to the document image.

3. A document input system according to claim 2, wherein the digital copier comprises:
image input/output processing means for inputting the document image;
management means for inputting information relating to the document image inputted by the image input/output processing means; and
image input control means for determining a system which is a transmission destination of the document image inputted by the image input/output processing means based on the information relating to the document image inputted by the management means and storing the document image in the sub-storage means corresponding to the determined system.

4. A document input system according to claim 1, wherein the digital copier comprises:
job history storage means for storing history of various jobs including an input of the document image; and
job history management means for, if an error occurs in transmission of an inputted document image to a system of a transmission destination, storing information indicating an occurrence of the error in the job history storage means.

5. A document input system according to claim 3, wherein the image input control means stores the generated title in the storage means with the document image.

6. A document input system according to claim 1, further comprising second storage means in which data storing time is longer than that of the storage means, and the transmitting means transfers the document image stored in the storage means and the information relating to the document image to the second storage means.

7. A document input system according to claim 1, wherein if an error occurs before an input of the document image is terminated, an occurrence of the error is notified at the digital copier and if an error occurs after the input of the document image is terminated, the occurrence of the error is notified to a system to which the document image inputted is transmitted.

8. A document input system according to claim 3, wherein until resetting to the information relating to the document image inputted by the management means is specified or a predetermined time passes after the document image is inputted by the image input/output processing means, the image input control means treats the document image inputted by the image input/output processing means as a series of information.

9. A document input system according to claim 1, wherein the transmission destination is a document filing system and the generated title and the document image corresponding to the generated title are transmitted to the document filing system.

10. A document input system according to claim 1, wherein the transmission destination is E-mail server and the transmitting means transmits a document image stored in the storage means to the E-mail server as an attached file of an E-mail.

11. A document input system according to claim 1, further comprising recognition means for recognizing a character string included in the document image stored in the storage means, wherein the transmission destination is an E-mail server and the transmitting means transmits the character string recognized by the recognition means to the E-mail server as data of a context of an E-mail.

12. A document input system according to claim 1, wherein the transmission destination is a groupware server and the transmitting means transmits the document image stored in the storage means to the groupware server.

13. A document input system according to claim 1, wherein the transmission destination is a client computer having a program for document edition and the document image transmitted from the transmitting means is used by the program.

14. A document input system according to claim 1, further comprising sub-storage means for storing the document image to be transmitted by the transmitting means,
wherein the transmitting means, after the document image stored in the storage means is stored in the sub-storage means, transmits the document image to the transmission destination.

15. A document input system according to claim 1, further comprising sub-storage means for storing a document image transmitted from the transmitting means,
wherein the transmitting means, if the document image information stored in the storage means can be transmitted to the transmission destination, transmits the document image information to the transmission destination and if not, stores the document image information in the sub-storage means.

16. A document input system according to claim 14, wherein a storage area of the sub-storage means is divided for the at least one system.

17. A document input system according to claim 15, wherein a storage area of the sub-storage means is divided for the at least one system.

18. A document input method comprising:
storing a document image inputted by a digital copier and information relating to the document image in a storage means, the information relating to the document image including information about a transmission destination;
generating a title for the document image based on priorities assigned, by the at least one digital copier, to the information relating to the document image; and
periodically reading from the storage means to determine if the stored document image was stored and, if so, transmitting the document image to the transmission destination based on the information relating to the document image.

19. A document input system comprising:
at least one digital copier for inputting a document image and information relating to the document image, the information including information about a transmission destination and the at least one digital copier generating a title for the document image based on the information relating to the document image inputted;
at least one system serving as a transmission destination of the document image inputted by the at least one digital copier;
storage means for storing the document image inputted by the at least one digital copier and the information relating to the document image, wherein the at least one digital copier generates a title for the document image based on the information relating to the document image inputted and the storage means includes sub-storage means, provided so as to correspond to the at least one system respectively, for storing the document image and the information relating to the document image; and
transmitting means for periodically reading from the storage means to determine if the document image is stored in the storage means and, if so, transmitting the document image to one of the at least one system based on the information relating to the document image, wherein the transmitting means includes sub-transmitting means, provided so as to correspond to the at least one system respectively, for transmitting the document image to one of the at least one system based on the information relating to the document image, wherein the digital copier includes:
image input/output processing means for inputting the document image,
management means for inputting information relating to the document image inputted by the image input/output processing means, and
image input control means for determining a system which is a transmission destination of the document image inputted by the image input/output processing means based on the information relating to the document image inputted by the management means and storing the document image in the sub-storage means corresponding to the determined system, wherein the image input control means stores the generated title in the storage means with the document image and assigns priorities to the information relating to the document image and generates the title for the document image based on the priorities.

20. A document input system according to claim 19, wherein the digital copier further comprises:
job history storage means for storing history of various jobs including an input of the document image; and
job history management means for, if an error occurs in transmission of an inputted document image to a system of a transmission destination, storing information indicating an occurrence of the error in the job history storage means.

* * * * *